United States Patent [19]

Beezhold

[11] Patent Number: 5,563,241
[45] Date of Patent: Oct. 8, 1996

[54] METHODS TO REMOVE PROTEINS FROM NATURAL RUBBER LATEX

[75] Inventor: Donald H. Beezhold, Owego, N.Y.

[73] Assignee: Guthrie Foundation for Education and Research, Sayre, Pa.

[21] Appl. No.: 404,695

[22] Filed: Mar. 15, 1995

[51] Int. Cl.$^6$ ............................. C08C 1/04; C08F 6/16
[52] U.S. Cl. .................... 528/482; 523/310; 524/925; 528/491; 528/492; 210/669
[58] Field of Search ........................ 523/310; 528/482, 528/491, 492; 524/925; 210/669

[56] References Cited

U.S. PATENT DOCUMENTS

| | | | |
|---|---|---|---|
| 2,049,828 | 8/1936 | Stevens | 18/50 |
| 2,140,198 | 12/1938 | Benzing et al. | 18/50 |
| 2,276,986 | 3/1942 | Kemp et al. | 260/821 |
| 2,683,124 | 7/1954 | D'Alelio | 528/482 |
| 3,048,556 | 8/1962 | Miller | 523/310 |
| 3,882,153 | 5/1975 | Seki et al. | 260/408 |
| 4,638,028 | 1/1987 | Liu et al. | 524/387 |
| 4,981,883 | 1/1991 | Kunz et al. | 523/310 |

FOREIGN PATENT DOCUMENTS

| 1131013 | 6/1962 | Germany | 523/310 |
|---|---|---|---|

OTHER PUBLICATIONS

D. H. Beezhold et al., "Identification of a 46-kD Latex Protein Allergen in Health Care Workers", *Clin. Exp. Immunol.* (1994) 98:408–413.

J. E. Slater, et al., "Latex Antigens", *J. Allergy Clin. Immunol.*, (Mar. 1992) 89(3):673–678.

D. Jaeger, et al., "Latex–Specific Proteins Causing Immediate–Type Cutaneous, Nasal, Bronchial, and Systemic Reactions", *J. Allergy Clin. Immunol.*, (Mar. 1992) 89(3):759–767.

K. Binkley, et al., "Generalized Allergic Reactions During Anesthesia", *J. Allergy Clin. Immunol.*, (Mar. 1992) 89(3):768–774.

D. H. Beezhold, "Latex Allergy", *Biomed. Instru. and Technol.*, (1992) 26(3):238–240.

C. Chambeyron et al., "Study of the Allergenic Fractions of Latex", *Allergy*, (1992) 47:92–97.

D. Beezhold, et al., "Surgical Glove Powders Bind Latex Antigens", *Archives of Surgery*,(1992) 127:1354–1357.

G. L. Sussman, et al., "The Spectrum of IgE–Mediated Responses to Latex", *JAMA*, (Jun. 5, 1991) 265(21):2844–2847.

R. L. Albright et al., "Ion–Exchange Polymers", *Encyclopedia of Polymer Science and Engineering*, 2nd Edition, (1987) 8:341–393.

*Primary Examiner*—Paul R. Michl
*Assistant Examiner*—Andrew E. C. Merriam
*Attorney, Agent, or Firm*—Panitch, Schwarze, Jacobs & Nadel, P.C.

[57] ABSTRACT

Natural latex rubber having reduced protein contamination is achieved by a method wherein rubber latex is contacted with an anion exchange resin at a pH greater than the isoelectric point of the proteins. After allowing the protein to complex with the resin, the protein-resin complex is separated from the latex to provide latex rubber having reduced protein contamination. Alternatively, or in addition, cation exchange resin may be contacted with latex rubber to increase the solubility of latex protein in the latex. In another embodiment, ion exchange resin may be added to water, and the water used to wash an article formed of latex, to thereby reduce protein contamination in the article. The methods allow the manufacture of latex-based articles having reduced irritability to skin.

17 Claims, No Drawings

METHODS TO REMOVE PROTEINS FROM NATURAL RUBBER LATEX

FIELD OF THE INVENTION

This invention relates to natural rubber latex, and more particularly pertains to methods for reducing the protein level in natural rubber latex and articles made therefrom.

BACKGROUND OF THE INVENTION

*Hevea brasiliensis* is a tree originating in the Amazonian region. The milky sap of this tree, known as the latex, comprises about 33% rubber, 65% water and 2% protein. The rubber, known as latex rubber or natural latex rubber or sometimes simply as "latex", is chemically known as 1,4-cis-polyisoprene. Latex rubber may be isolated from latex by a variety of processes and incorporated into many manufactured articles. The world production of latex rubber is on the order of 6 million tons per year, and one major use of latex rubber is in the manufacture of gloves, known as latex gloves. With modern society's anxiety about transmission of viral and bacterial infection via contact with contaminated body fluids, the use of latex gloves has become an increasingly prevalent standard operating procedure for many workers.

Since about 1979, there have appeared numerous reports of severe anaphylactic reactions to medical devices, e.g., gloves, manufactured from *Hevea brasiliensis* latex, and this has prompted much concern in the medical community. See, e.g., Sussman et al. "The Spectrum of IgE-mediated Responses to Latex" JAMA 265:2844–2847, 1991. Research has indicated that these allergic reactions are the result of sensitization to proteins present in latex rubber. It is generally the case that when rubber is isolated from the latex, proteins that are also found in the latex, known as latex proteins, are isolated with the rubber and become incorporated into articles made from latex rubber.

Initially, it was believed that only one or a very few of the latex proteins were the offending allergens. However, an increasing number of research studies demonstrate that many latex proteins can serve as allergens. See Beezhold et al., "Identification of a 46-kD latex protein allergen in health care workers", *Clin. Exp. Immunol.* 98:408–413 (1994). This may be due, in part, to the process used to isolate latex rubber from *Hevea brasiliensis*, which relies upon added ammonium hydroxide to stabilize the latex. The ammonium hydroxide is thought to denature the latex proteins from their native configuration to produce a mixture of polypeptides. The denatured peptides are readily absorbed into skin and apparently are highly immunogenic.

Several approaches have been examined by the latex device manufacturing industry to overcome the problem of latex protein sensitivity. One approach has been to subject the latex article, e.g., gloves, to multiple leaching or washing steps. As part of the washing, chlorination of the product has become common practice. While this approach can effectively reduce the protein levels in the end product, it also weakens the latex film and reduces the barrier properties of the product. The additional washing and chlorination steps increase production costs because of the expense of increased processing and higher failure rates.

Another approach which has been explored is the use of proteolytic enzymes to degrade the proteins in latex. However, this approach has the problem of introducing another protein (the enzyme) to the latex, which may itself be allergenic.

Recognition of the sensitivity problem has prompted suppliers of latex rubber to search for isolation/purification processes that are more effective at separating latex protein from latex rubber. A currently popular approach is to subject the latex to a double centrifugation regime. Latex suppliers report that this regime reduces protein levels by 50%, however that contention is questionable.

There is thus an increasingly recognized need in the art for latex rubber-containing devices, including latex gloves and condoms, which can serve as effective barriers to bacterial and viral transmission, and which do not cause unwanted allergic reactions.

SUMMARY OF THE INVENTION

The present invention is directed to a method for substantially reducing the protein content of natural rubber latex. The method comprises the steps (a) providing contact between protein-containing aqueous natural rubber latex and anion exchange resin, at a pH above the isoelectric point of the protein, to provide protein-complexed anion exchange resin; and (b) separating the protein-complexed anion exchange resin from the aqueous natural rubber latex to provide latex having reduced protein content.

Another embodiment of the invention provides for a method of separating protein from natural rubber latex which comprises contacting protein-containing aqueous natural rubber latex with a cation exchange resin to solubilize the protein, subsequently separating cation exchange resin from the latex, and subsequently separating solubilized proteins from the latex.

The invention further provides a method of removing protein from an article formed at least in part from latex rubber, where the method comprises washing the article with an aqueous solution comprising an ion exchange resin selected from the group consisting of anion exchange resin and cation exchange resin.

DETAILED DESCRIPTION OF THE PREFERRED EMBODIMENTS

According to one aspect of the invention, an aqueous latex, containing rubber and protein, at a pH above the isoelectric point of the protein, is contacted with an anion exchange resin. The contact allows the protein to complex with the anion exchange resin. The anion exchange resin, having protein complexed thereto, is then separated from the aqueous latex, providing an aqueous latex having an increased rubber/protein ratio.

Natural rubber latex, as obtained directly from natural sources, for example, *Hevea brasiliensis*, has a rubber solids content of about 33%. Most customers for latex prefer to work with a higher solids latex. Thus, as commonly available, latex is about 60–70% rubber solids. Stabilization of this high solids latex is achieved, at least in part, by the addition of a basic material to the latex. Typically, as available commercially, the latex contains ammonium hydroxide, and has a pH of about 11. Natural rubber latex at 60–70% rubber solids is available from, for example, Guthrie Latex Inc., Phoenix, Ariz. as Dynatex GTX®, which contains 0.55% ammonia. Another source is Kautschuk Co., Frankfurt, Germany which sells a latex containing 0.7% ammonia.

Natural rubber latex at 60–70% rubber solids, and incorporating ammonia as a stabilization agent, is preferred for the present invention. According to the invention, some amount of basic material, such as ammonium hydroxide, must be present in the aqueous rubber latex, so that the pH of the latex is above the isoelectric point of the proteins which are desirably separated from the latex rubber. While ammonium hydroxide is a preferred base to have present with rubber latex in order to increase the pH, other basic materials may instead, or additionally, be used. Exemplary, non-limiting bases include sodium hydroxide, potassium hydroxide, and sodium carbonate as well as ammonium hydroxide. Thus, according to the invention, the pH of the latex should be above about 6, and preferably is about 9 to about 12.

Proteins are amphoteric molecules and their net charge depends on the pH of the solution in which they are stored. At a certain pH value called the isoelectric point (pI), amphoteric substances have zero net charge. Each protein has a unique pI based on its amino acid composition. When proteins are in solutions with a pH above their isoelectric points, they will have a net negative charge. Latex proteins have an isoelectric point (pI) in the acidic range of 4–6. See, e.g., Chambeyron et al., "Study of the Allergenic Fractions of Latex" Allergy 47:92–97, 1992. By adjusting the pH of the latex to be greater than about 6, and preferably about 9 to about 12, one can ensure that substantially all of the proteins carry a net negative charge.

Anion exchange resins, also known as anion exchange polymers, are well-known in the art. See, e.g., Albright, R. L. and Yarnell, P. A., "Ion-Exchange Polymers" *Encyclopedia of Polymer Science and Engineering,* 8:341–393 (1987), the entire disclosure of which is hereby incorporated by reference. Anion exchange resins useful in the invention include resins having a bulk material with a net positive charge, and neutralizing anionic species associated therewith. The bulk material may be a polymer comprising the polymerization product of at least one monomer selected from the group consisting of styrene and acrylate. In a preferred embodiment, the polymer is crosslinked, where a suitable crosslinking agent is divinyl benzene. The net positive charge is typically present on the bulk material by virtue of the presence of quaternary ammonium groups, such as the trialkylammonium and dialkylethanolammonium groups that are covalently bonded to the polymerization product. Diethyl-(2-hydroxypropyl)aminoethyl and diethylaminoethyl are preferred quaternary ammonium groups according to the invention. In close association with the bulk material, by virtue of ionic bonding, is a negatively charged neutralizing species, also known as a counterion, where typical counterions include bicarbonate ($HCO_3^-$), sulfate ($SO_4^{2-}$), hydroxide ($OH^-$) and halide including chloride ($Cl^-$).

Suitable anion exchange resins are commercially available from, for example, Rohm and Haas, Co., Philadelphia, Pa. and others. A preferred anion exchange resin is QAE-Sepharose or Sephadex, available from Pharmacia, Sweden. QAE-Sepharose contains the diethyl-(2-hydroxypropyl)aminoethyl group to provide the positive charge to the bulk material. DEAE-Sephacel (Pharmacia, Sweden), where "DEAE" indicates that diethylaminoethyl groups are responsible for the positive charge on the bulk phase, may also be used.

Because opposite charges attract, negatively-charged proteins will bind to a positively-charged molecule or matrix. Thus, the proteins in an aqueous rubber latex at a pH of about 11 will be negatively-charged and attracted to a positively charged ion exchange resin. In this way, combining anion exchange resin with high-pH latex will cause the latex proteins to be bound, also known as complexed, to the resin: when the resin is separated from the latex, the protein bound to the resin will also be separated from the natural rubber.

The latex and exchange resin are readily combined and stirred at ambient temperature to achieve sufficient contact between the latex and resin to provide the desired effects according to the invention. The stirring period need not be long; one hour will generally be sufficient, with shorter times also being practical. Generally, about 1 g ion exchange resin may be added to about 10 mL of latex, where the latex is at about 60–70% rubber solids.

After the aqueous rubber latex has been contacted with the anion exchange resin to provide a complex between the resin and the proteins having a net negative charge, the protein-complexed anion exchange resin must be separated from the aqueous latex. Methodology for contacting and then separating ion exchange resin from a solution is well-known in the art, and any such means may be employed in the instant invention.

According to one embodiment, this separation may be achieved by use of centrifugation. Thus, after forming a mixture of aqueous latex rubber and anion exchange resin, the mixture may be placed into a centrifuge and spun for a suitable length of time and gravitation force. The centrifugation yields a pellet which comprises mainly the anion exchange resin to which protein is complexed. The supernatant, which contains latex rubber having reduced contamination with protein, is decanted from the pellet. The latex manufacturing industry already employs centrifugation, and thus the above-described separation technique may be readily adopted by that industry.

According to another embodiment, the anion exchange resin is in the form of a bed, which sits atop a perforated supporting plate. The aqueous latex is then poured onto the top of the bed, and under the influence of gravity passes through the bed and is collected after passing through the perforated support. Vacuum and/or pressure may be employed to encourage the latex to pass through the resin bed. The dimension of the resin bed will depend on the amount of latex being passed therethrough, and may be determined using ordinary experimentation.

According to still another embodiment, the anion exchange resin is bound to pieces of support, and added in this form to an aqueous rubber latex. After adequate contact between the latex and the resin, preferably facilitated by stirring, the mixture is poured through a filter. The filter should have holes of sufficient size that the aqueous latex, but not the pieces of support, will pass through the filter.

After isolating the protein-resin complex, the resin may be regenerated and used in future separations. Techniques to regenerate anion exchange resins are well-known in the art, and may be utilized in connection with the present invention. Regeneration may be accomplished by, for example, washing the complex with 1 M NaCl or acid.

As described above, contact between an anion exchange resin and a latex solution provides a resin-protein complex, which may be separated from the latex to provide latex having reduced protein concentration. The reduction in protein concentration of the latex may be observed by an ELISA assay, in which the amount of protein extracted from a dried film of latex is measured. The ELISA assay may be performed as described in Beezhold, D. H., "LEAP: Latex ELISA for Antigenic Proteins", *The Guthrie Journal,* 61:77–81, 1992. As used herein, the amount of protein which may be extracted and measured by the LEAP© assay is referred to as "soluble protein". Contact between latex and anion exchange resin according to the invention has been found to reduce the soluble protein, and thus overall protein, content of latex. As shown in the Examples below, the soluble protein content of latex can be readily reduced by at least about 70%, and with multiple treatments the soluble protein content of the latex can be reduced by up to about 98%, i.e., substantially all soluble protein can be separated from the latex.

According to another aspect of the invention, latex is contacted with cation exchange resin. Intimate contact between the latex and cation exchange resin has been surprisingly found to greatly increase the amount of soluble protein present in the latex, i.e., by converting insoluble proteins to water-soluble proteins. Latex articles that are prepared from latex that has been treated with cation exchange resin can be expected to more readily give up protein during conventional washing and leaching procedures now used commercially to purify latex articles.

Cation exchange resins are similarly well-known in the art, and are described in the Albright R. L. and Yarnell, P. A. article, above. In a cation exchange resin, the bulk material has a negative charge, achieved by covalent bonding between a negatively charged functional group and the polystyrene and/or polyacrylate which typically forms the backbone of the bulk material. Typical negatively charged groups include sulfate, sulfonate, sulphopropyl, methyl sulphonate, phosphate and carboxylate. In association with the negatively charged bulk material, by virtue of ionic bonding, are positively charged counterions, where calcium, sodium and hydrogen ($H^+$) are common counterions.

Preferred cationic exchange resins include CM-Sepharose, SP Sepharose (contains the sulphopropyl group) and S Sepharose (contains the methyl sulphonate group), all available from Pharmacia, Sweden. However, there is really no limitation on the identity of the cation exchange resin which may be used according to the inventive method. Suitable sources of cation exchange resins include Meta Chem Technologies (Redondo Beach, Calif.), Supelco, Inc. (Bellefonte, Pa.), BioRad Labs (Melville, N.Y.) as well as many others.

The amount of cation exchange resin that is preferably combined with the latex, and the manner of addition, is essentially the same as the amount of anion exchange resin that may be combined with the latex, as previously described. Thus about 1 gram of cation exchange resin may be combined with about 10 mL of latex at 60–70% rubber solids.

The latex should be separated from the cation exchange resin prior to manufacture of an article made from that latex. The separation may be achieved by centrifugation, where the resin forms a pellet and the latex with associated protein is retained in the supernatant. Any technique used to separate protein-complexed anion exchange resin from latex may also be used to separate cation exchange resin from latex.

According to a preferred embodiment, about 20 g to about 100 g of ion exchange resin, either cationic or anionic exchange resin, may be combined with about 100 g to about 600 g of latex, on a solids basis. Stated another way, the natural rubber and the ion exchange resin are contacted in a natural rubber:ion exchange resin weight ratio of about 1:1 to about 30:1. Preferably, the natural rubber:ion exchange resin weight ratio is about 5:1 to about 7:1. It should be understood that "ion exchanger resin" as referred to in the above weight ratios refer to either of anion exchange resin or cation exchange resin.

According to the invention, treatment of the latex with an anionic exchange resin may be followed by one or more treatments of the latex with a cationic ion exchange resin. Alternatively, or in addition, treatment of the latex with a cationic exchange resin may be followed by one or more treatments of the latex with an anionic ion exchange resin. The later sequence, i.e., cationic treatment followed by anionic treatment, is particularly desirable as the treatment with cationic ion exchange resin may solubilize protein in the latex, and the solubilized protein may be separated from the latex by treatment with anionic exchange resin, as described above.

According to yet another aspect of the invention, anion or cation exchange resin may be added to the washing and leaching solutions commonly used to wash proteins away from articles made from latex rubber. The addition of resin both improves the efficiency of the washing/leaching process, in that more protein may be removed from the articles for the same amount of water, and extends the lifetime of the solutions, in that water can be recovered and then reused to effectively rinse another latex article to reduce the protein content thereof.

The cation and anion exchange resins described above are suitable for addition to the washing/leaching water. In a preferred embodiment, the ion exchange resin is selected from, for example, DEAE-Sephacel, CM-Sepharose and QAE-Sepharose.

The washing is readily accomplished by bringing an article made at least in part from rubber latex, into contact with an aqueous solution comprising ion exchange resin. The article may be submerged in the solution, optionally with agitation. The amount of ion exchange resin in the water is not critical: the more resin present, the more effective will be the water at washing/leaching the latex protein from the latex-made article.

The methods of the invention allow the formation of latex articles having a reduced level of protein. Such articles include gloves, condoms, balloons, catheters, anesthetic breathing bags and the like.

The following examples are set forth as a means of illustrating the present invention and are not to be construed as a limitation thereon.

General Procedures

In order to determine the content of soluble protein in a slurry of rubber latex, a sample of the latex slurry is poured onto a glass plate and spread into a thin film using a glass rod. The film is allowed to air dry overnight. The following day, film is scraped off the plate and extracted by cutting the film into small pieces and soaking the pieces in a phosphate buffered saline solution for about 24 hours. The level of proteins in the extract is determined by the LEAP© assay as described in Beezhold, D. H., "LEAP: Latex ELISA for Antigenic Proteins", *The Guthrie Journal*, 61:77–81, 1992, the entire disclosure of which is incorporated herein by reference. Standard protein assays, e.g., Lowry, Bradford and BCA, are not preferred as they have been found to be subject to considerable interference by the other substances present in the latex.

In the Tables which follow, "Soluble Protein in µg/g" refers to the µg of protein measured by the LEAP® assay, divided by the grams of dried latex film, also referred to as herein as latex rubber solids, used in the assay, and obtained as described above.

EXAMPLE 1

Latex Treatment With Anion Exchange Resin

DEAE-Sephacel (Pharmacia, Sweden) resin, a weakly basic anion exchange resin, was equilibrated in 0.7% ammonium hydroxide at pH 11.4, and centrifuged to pellet the resin. The resin was resuspended in water to provide an approximately 50% vol/vol slurry, and 5 mL slurry was added to each of several 15 mL centrifuge tubes. The slurry was again centrifuged to pellet the resin, and the buffer decanted from the pellet. Next, 5 mL of ammoniated natural rubber latex (Guthrie Latex, Tucson, Ariz.) was added to each of the tubes, and the tubes were placed on a Rocker platform for 10 min to allow the proteins to bind to the resin. Each tube was then centrifuged to pellet the resin, and the latex-containing supernatant was isolated.

As seen from Table 1, the latex as obtained from the supplier contained 192 μg soluble protein/g dried latex film. After treating the latex solution as described above, a latex film derived therefrom contained only 50 μg soluble protein/g latex rubber solids. See TABLE 1. This demonstrates that 74% of the soluble protein was removed from the latex according to the afore-described procedure.

Further reductions in the soluble protein content of a latex could be obtained by multiple treatments with anion exchange resin. Thus, a latex solution was treated with DEAE-Sephacel and the resin formed into a pellet by centrifugation as described above. The supernatant was then treated with an additional aliquot of DEAE-Sephacel, using the same amounts as for the previous treatment, and then dried to a film as described above. The film was analyzed by the LEAP© assay for soluble protein content, and found to contain only 28 μg soluble protein/g latex rubber solids. See TABLE 1. This demonstrates that two treatments with DEAE-Sephacel achieves an 85% reduction in the soluble protein level of a natural rubber latex.

A third treatment achieved a further, although slight reduction in soluble protein content, as seen in TABLE 1. The foregoing results were qualitatively supported by analyzing the dried films by SDS-polyacrylamide gel electrophoresis and Western blotting with a polyclonal antiserum which recognized the soluble latex proteins.

The foregoing experiments were repeated with QAE resin (Pharmacia, Sweden), which is a strongly basic anion exchange resin. The results are shown in TABLE 1, and demonstrate that QAE resin is somewhat more effective at removing soluble protein from latex than is DEAE-Sephacel.

TABLE 1

| Latex Treatment | Soluble Protein in μg/gm | % Reduction |
| --- | --- | --- |
| Control | 192 | 0 |
| 1X DEAE | 50 | 74 |
| 2X DEAE | 28 | 85 |
| 3X DEAE | 26 | 86 |
| Control | 175 | 0 |
| 1X QAE | 26.8 | 85 |
| 2X QAE | 7.8 | 96 |
| 3X QAE | 3.4 | 98 |

EXAMPLE 2

Latex Treatment With Cation Exchange Resin

Experiments were performed as described in Example 1, however a cation exchange resin, CM-Sepharose (Pharmacia, Sweden) was substituted for the anion exchange resin. The results are set forth in TABLE 2, and show that treatment of a latex slurry with CM-Sepharose increases the amount of soluble protein present in a dried latex film obtained from the treated latex. According to the data in TABLE 2, a single treatment with CM-Sepharose increases the amount of soluble protein in the latex by a factor of 165. Subsequent treatments with cation exchange resin, as shown in TABLE 2, confirmed that the amount of soluble protein in the latex increased upon treatment with cation exchange resin.

It should be understood that by "2X CM" in TABLE 2, a sample of latex was treated with CM-Sepharose, then the mixture was centrifuged to pellet the cation exchange resin. The supernatant was separated from the pellet and treated with another dose of CM-Sepharose. Again the mixture was centrifuged to pellet the cation exchange resin, and the supernatant isolated from the pellet. The supernatant obtained after the second centrifugation was coated onto a surface to prepare a film for the LEAP© assay as described above.

While this enhancement in the soluble protein might possibly have been the result of a positive interference in the LEAP© assay, the observation of increased soluble protein was corroborated by SDS-PAGE electrophoresis and by Western blotting techniques: both corroborating methods confirmed the increased amount of soluble protein in extracts from the CM-Sepharose-treated latex.

TABLE 2

| Latex Treatment | Soluble Protein in μg/gm |
| --- | --- |
| Control | 90.8 |
| 1X CM | 14,976 |
| 2X CM | 7,951 |
| 3X CM | 4,009 |

EXAMPLE 3

Extraction Efficiency With Anion Exchange Resin

Tubes, each containing 4 mL of latex (Guthrie Latex, Tucson, Ariz., 64% rubber solids), were treated with various amounts of a 50% vol/vol slurry of QAE Sepharose in 0.7% aqueous ammonium hydroxide. The various amounts are listed in TABLE 3, under the column heading "Latex Treatment". The amount of QAE-Sepharose, on a solids basis, being combined with the latex, on a per mL basis, is indicated in TABLE 3 under the column heading "Calculated weight of QAE mg/mL".

The treated tubes of latex were centrifuged, and the supernatant formed into a film as described in Example 1. The soluble protein content of each film is indicated in TABLE 3. The data in TABLE 3 show that approximately 84 mg of QAE-Sepharose resin can be combined with one mL of latex slurry having about 64% rubber solids to achieve a 92% reduction in the soluble protein content of the latex in a single extraction step.

TABLE 3

| Latex Treatment | Calculated weight of QAE mg/mL | Soluble Protein in μg/gm | % Reduction |
| --- | --- | --- | --- |
| Control (No QAE) | 0 | 70.3 | 0 |
| 0.1 mL | 2 | 77.9 | −11 |
| 0.5 mL | 8 | 65.4 | 7 |
| 1.0 mL | 17 | 38.9 | 45 |
| 2.5 mL | 42 | 13.2 | 81 |
| 5.0 mL | 84 | 5.6 | 92 |

EXAMPLE 4

Effect of Protein Extraction On Latex Film Properties

Dried latex films were prepared from latex which had been treated with either DEAE-Sephacel, QAE-Sepharose, G-25 (Pharmacia, Sweden), or no ion exchange resin. G-25 is a precursor to many ion exchange resins, and is itself non-ionic or neutral, i.e., not anionic or cationic. Two physical properties, namely tensile strength and elongation at break, for each of the films were measured, both immediately after forming the films, and after the films had aged for 7 days. The results of these studies are set forth in TABLE 4.

As seen from TABLE 4, resin treatment appears to affect the properties of the newly formed films, in that both tensile strength and elongation at break are lowered somewhat. However, when the tests were repeated after the films had aged for 7 days, there were no essential differences in the physical properties of the films. These results suggest that treatment of latex solutions with ion exchange resins according to the invention will produce a latex which can be used in commercial applications.

TABLE 4

| Latex Film Treatment | Tensile Strength | | Elongation at Break | |
| --- | --- | --- | --- | --- |
| | Initial | Aged (7 days 70° C.) | Initial | Aged (7 days 70° C.) |
| Control | 20.4 ± 1.98 | 18.7 ± 4.88 | 804 ± 17 | 794 ± 23 |
| G-25 | 16.9 ± 1.69 | 15.9 ± 2.67 | 741 ± 11 | 734 ± 32 |
| DEAE | 14.3 ± 3.76 | 18.3 ± 2.09 | 740 ± 16 | 750 ± 16 |
| QAE | 16.5 ± 1.59 | 17.8 ± 1.49 | 765 ± 14 | 792 ± 10 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for reducing the protein content of natural rubber latex, comprising the steps
   a) providing contact between protein-containing aqueous natural rubber latex and anion exchange resin, wherein the natural rubber latex comprises natural rubber, and the natural rubber and anion exchange resin are contacted in a natural rubber:anion exchange resin weight ratio of about 1:1 to about 30:1 at a pH above the isoelectric point of the protein, to provide protein-complexed anion-exchange resin, said pH being raised to above the isoelectric point of the protein by contacting the aqueous rubber latex with a base comprising ammonium hydroxide;
   b) separating the protein-complexed anion exchange resin from the aqueous natural rubber latex to provide latex having reduced protein content.

2. The method of claim 1 wherein the pH is about 9 to about 12.

3. The method of claim 1 wherein the anion exchange resin is a polymer comprising the polymerization product of at least one monomer selected from the group consisting of styrene and acrylate, said polymer having covalent attachment to a quaternary ammonium group, and ionic bonding to a negatively charged counterion.

4. The method of claim 3 wherein said quaternary ammonium group is selected from the group consisting of diethylaminoethyl and diethyl-(2-hydroxypropyl)amino ethyl.

5. The method of claim 1 wherein said natural rubber:anion exchange resin weight ratio is about 5:1 to about 7:1.

6. The method of claim 1 wherein the protein-complexed anion exchange resin is removed from the aqueous latex through centrifugation followed by decanting an aqueous supernatant comprising latex from a pellet comprising protein-complexed anion exchange resin.

7. The method of claim 1 wherein the anion exchange resin forms a bed supported by a perforated member, and the protein-containing aqueous latex is passed through the bed under conditions such that protein from the latex complexes to the anion exchange resin and aqueous latex passes through the perforations and is collected.

8. The method of claim 1 wherein the anion exchange resin is bound to pieces of support.

9. The method of claim 8 wherein filtration is used to separate the protein-complexed anion exchange resin from the aqueous natural latex rubber.

10. The method of claim 1 wherein at least about 70% of the protein content of the aqueous natural rubber latex is separated from the latex, where the protein content is measured by extracting protein from a thin film of dried latex, using phosphate buffered saline solution, during a soaking period of about 24 hours.

11. A method of removing protein from natural rubber latex comprising contacting protein-containing aqueous natural rubber latex at a pH of about 9 to about 12 with a cation exchange resin to solubilize the proteins, subsequently separating the cation exchange resin from the latex, and separating solubilized proteins from the latex, wherein the cation exchange resin is a polymer comprising the polymerization product of at least one monomer selected from the group consisting of styrene and acrylate, said polymer having covalent attachment to a negatively-charged group, and ionic bonding to a positively charged counterion.

12. The method of claim 11 wherein said negatively-charged group is selected from the group consisting of sulfate, sulfonate, sulphopropyl, methyl sulphonate, phosphate and carboxylate.

13. The method of claim 11 wherein said positively charged counterion is selected from the group consisting of calcium, sodium and hydrogen ($H^+$).

14. The method of claim 11 wherein said protein-containing aqueous natural rubber latex comprises natural rubber, and said natural rubber is contacted with said cation exchange resin in a natural rubber:cation exchange resin weight ratio of about 1:1 to about 30:1.

15. The method of claim 14 wherein said natural rubber:cation exchange resin weight ratio is from about 5:1 to about 7:1.

16. The method of claim 11 wherein the subsequent separating of proteins from the latex is achieved by contacting the latex with anion exchange resin, at a pH above the isoelectric point of the protein, to provide protein-complexed anion exchange resin; and subsequently separating the protein-complexed anion exchange resin from the aqueous natural rubber latex to provide latex having reduced protein content.

17. The method of claim 11 wherein the subsequent separating of proteins from the latex is achieved by forming the latex into an article, and washing the article with an aqueous solution.

* * * * *